United States Patent
Gajdzinski et al.

(10) Patent No.: US 10,628,769 B2
(45) Date of Patent: Apr. 21, 2020

(54) METHOD AND SYSTEM FOR A CROSS-DOMAIN ENTERPRISE COLLABORATIVE DECISION SUPPORT FRAMEWORK

(71) Applicant: Dassault Systemes Americas Corp., Waltham, MA (US)

(72) Inventors: Grzegorz Gajdzinski, Long Beach, CA (US); Minh Tuan Nguyen, Westminster, CA (US); Nicholas Schleich, Huntington Beach, CA (US)

(73) Assignee: DASSAULT SYSTEMES AMERICAS CORP., Waltham, MA (US)

( * ) Notice: Subject to any disclaimer, the term of this patent is extended or adjusted under 35 U.S.C. 154(b) by 392 days.

(21) Appl. No.: 14/588,107

(22) Filed: Dec. 31, 2014

(65) Prior Publication Data

US 2016/0189081 A1 Jun. 30, 2016

(51) Int. Cl.
*G06Q 10/06* (2012.01)
(52) U.S. Cl.
CPC ..... *G06Q 10/06393* (2013.01); *G06Q 10/063* (2013.01); *G06Q 10/06* (2013.01)
(58) Field of Classification Search
None
See application file for complete search history.

(56) References Cited

U.S. PATENT DOCUMENTS

| | | | |
|---|---|---|---|
| 4,862,376 A | 8/1989 | Ferriter et al. | |
| 5,555,406 A | 9/1996 | Nozawa | |
| 5,576,965 A | 11/1996 | Akasaka et al. | |
| 5,579,231 A | 11/1996 | Sudou et al. | |
| 5,761,674 A | 6/1998 | Ito | |
| 6,108,662 A | 8/2000 | Hoskins et al. | |
| 6,177,942 B1 | 1/2001 | Keong et al. | |

(Continued)

OTHER PUBLICATIONS

Li Da Xu, Information architecture for supply chain quality management, May 5, 2010, International Journal of Production Research vol. 49, No. 1, Jan. 1, 2011, 183-198.*

(Continued)

*Primary Examiner* — Christine M Behncke
*Assistant Examiner* — Matthew H Divelbiss
(74) *Attorney, Agent, or Firm* — Armstrong Teasdale LLP

(57) ABSTRACT

A method and a system for cross-domain enterprise collaborative decision support within an enterprise are provided. The method includes receiving a set of information from an asset component through an embedded cell for analytics (ECA) and analyzing the set of information in real-time using a generative algorithm in a traveling intelligent cell (TIC), the TIC including at least one of a generic equipment and process data set, a specific equipment and process data set, and a dynamic deployment data set. The method also includes measuring asset component performance using the set of information and a key performance indictor (KPI) engine, comparing end results of the measured asset component performance to respective quality specification data using a data mining engine, determining a probability that a process parameter affected the measured asset component performance, and presenting a visualization of a correlated analysis to one or more subscribed users.

16 Claims, 6 Drawing Sheets

(56) References Cited

U.S. PATENT DOCUMENTS

| | | |
|---|---|---|
| 6,295,513 B1 | 9/2001 | Thackston |
| 7,134,096 B2 | 11/2006 | Brathwaite et al. |
| 7,712,058 B2 | 5/2010 | Brathwaite et al. |
| 8,806,398 B2 | 8/2014 | Brathwaite et al. |
| 2003/0187763 A1 | 10/2003 | Jordan et al. |
| 2004/0153437 A1* | 8/2004 | Buchan ............... G06Q 10/06 |
| 2005/0216429 A1* | 9/2005 | Hertz ................... G06Q 10/06 |
| 2006/0064486 A1* | 3/2006 | Baron ................ H04L 41/0886 709/224 |
| 2006/0089939 A1 | 4/2006 | Broda et al. |
| 2007/0078553 A1 | 4/2007 | Miwa et al. |
| 2007/0106642 A1 | 5/2007 | Kovrigin et al. |
| 2007/0192715 A1 | 8/2007 | Kataria et al. |
| 2008/0313596 A1* | 12/2008 | Kreamer ............... G06Q 10/06 717/101 |
| 2009/0327023 A1 | 12/2009 | Nanji |
| 2011/0029824 A1 | 2/2011 | Scholer et al. |
| 2012/0150570 A1 | 6/2012 | Samad-Khan |
| 2013/0080207 A1* | 3/2013 | Lyras .................. G06Q 10/063 705/7.28 |
| 2013/0332240 A1 | 12/2013 | Patri et al. |
| 2014/0074629 A1 | 3/2014 | Rathod |
| 2014/0089224 A1 | 3/2014 | Brown et al. |
| 2014/0364985 A1 | 12/2014 | Tiwari et al. |

OTHER PUBLICATIONS

Chuck Ballard et al., Moving Forward with the On Demand Real-time Enterprise, IBM Redbook Form No. SG24-7104-00, ISBN : 0738494917.*

Kestel "Risk Identification and Mitigation through Process Potential Failure" (2012) (retrieved from http://www.mwcmc.org/resources/documents/01-06-02 kestel_pfmea_at_orbital_sciences.pdf).

Sly "Manufacturing Process Management (MPM)" (2004) (retrieved from http://www.proplanner.com/documents/filelibrary/documents/papers_case_studies/MPM_Whitepaper_Tech_Trend_PDF_CDF4B29897EE8.pdf).

* cited by examiner

METHOD AND SYSTEM FOR A CROSS-DOMAIN ENTERPRISE COLLABORATIVE DECISION SUPPORT FRAMEWORK

BACKGROUND

This disclosure relates generally to management decision-making support and, more particularly, to a method and system for cross-domain enterprise collaborative decision support.

Current trends in the manufacturing environment increase the weight of collaboration in the manufacturing process. While developing information and processes has always been important in the manufacturing process, with recent emphasis on the convergence of IT and the manufacturing process, leading organizations have begun taking collaboration to the next level.

An example of these trends is the Enterprise Bill of Process (eBOP). With increasingly capable IT infrastructures, the Bill of Process (BOP), is becoming a global consideration in Manufacturing Operations Management (MOM) and Product Lifecycle Management (PLM). The resulting eBOP, a best practices template for production, is creating a place for cross-functional teams to share information and collaborate in ways that weren't possible before.

The resulting shift toward process-centric management of workflows across the enterprise using eBOP is similar to taking a Business Process Management (BPM) approach on the shop floor.

At least some known manufacturing processes begin with a product idea that is first visualized with an engineering design, followed by the creation of a Bill of Materials (BOM). The BOM is a list of parts and materials needed to make a product, and, without it, manufacturing would be impossible. But the BOM is only part of the product equation. It shows "what" to make, not "how" to manufacture it, leaving the rest up to the BOP.

During the design process, engineers create a design-oriented parts list, i.e., eBOM, which represents how engineering views the product. Manufacturing engineers restructure the eBOM into a process-oriented mBOM (commonly known as a Bill of Process—BOP). It will show how the product will be made, and simultaneously create the sequence of steps to produce a part and the required resources—work centers, tools and skills.

The BOP includes detailed plans explaining the manufacturing processes for a particular product. Within these plans resides in-depth information on machinery, plant resources, equipment layout, configurations, tools, and instructions. Traditionally, companies with many plants and processes have only informal BOPs for each location, or for each product or manufacturing line at a location. Changes to the BOP are communicated to the rest of the enterprise during periodic meetings of the interested parties and it is typical for the process to take a long time and a lot of man/hours. There is a lack of efficiency, scalability, and visibility in this methodology.

There have been many attempts to bring data and activities from PLM and MOM together within the so-called "Digital Manufacturing" discipline. An example is a concept to combine the eBOP and BPM (Business Process Management) to act as an integration platform between Engineering and Manufacturing Operations. There are also many collaboration platforms, but these are very generic social platforms and do not provide process management capabilities.

Global Manufacturing enterprises have invested heavily in operational excellence practices for many years, wringing the inefficiencies out of every operation in the production process. Supply chains have been tightened, inventories reduced or virtually eliminated with just-in-time processing, and production operations at every stage streamlined and optimized.

But there is one area in the lean revolution that often is not considered—not because it doesn't matter, but because it has been so difficult to deliver a solution. That neglected area is the management decision-making process. For example, consider a global manufacturer that has practiced continuous improvement for a period of time. During that time, products roll off the assembly line with precision. The quality team is successfully managing a quality of production worldwide, so yields are consistently high. Warehouses operate at top efficiency. And then, a supplier problem develops such as, a key component begins trending out of specification. The response of the global manufacturer to this problem depends on the managers who have responsibility, how quickly can they identify the problem, whether corrective action procedures are in place, how quickly they correct the problem, and how accurately.

A main challenge is how to get the optimal inter-cooperation out of the key enterprise process domains and let the results drive the relevant business decision processes within a social collaborative environment:

Enterprise Resource Planning (ERP)—as the highest financial and commercial system domain.

Product Lifecycle Management (PLM)—or the Global Engineering system domain.

Manufacturing Operations Management (MOM) or Global Production Management system domain.

There are already many attempts to bring these domains to cooperate together, but the focus is mainly on how to make these extremely isolated systems (ERP, PLM, MOM) exchange their data efficiently. In general, these efforts focused mainly on the system interface or interconnection, with some use-cases or business scenarios demonstrating the benefits of those data sharing or exchange. There are many attempts to bring data and activities from PLM and MOM together within the so-called "Digital Manufacturing" discipline.

There are several concepts to make the combined eBOP (Enterprise Bill-Of-Process) and MOM (Manufacturing Operations Management) acting as platform for data interchange between both domains—but these efforts don't involve Business Process Management. There are also generic collaboration frameworks in the market—like Yammer, Jive etc. But, these are only generic frameworks and there is no workflow or procedure involved for the collaborative decision-making. There is no concept or real-world practice that addresses the holistic interoperability for key decision-makers in the global enterprise and covering all enterprise domains with global governance from the BPM point of view. Known attempts provide only narrow-scope interconnections between ERP, PLM, and MOM systems and mainly focus on data exchange.

BRIEF DESCRIPTION

In one aspect, a computer-implemented method for cross-domain enterprise collaborative decision support within an enterprise includes receiving a set of information from an asset component through an embedded cell for analytics (ECA), the set of information including production equipment and production systems blueprint data, the asset component embodied in at least one of a machine and a process. The method further includes analyzing the set of information in real-time using a generative algorithm in a traveling intelligent cell (TIC), an intelligent enterprise bill-of-process including a generative container for the TIC, the TIC including at least one of a generic equipment and process data set, a specific equipment and process data set, and a dynamic deployment data set. The method also includes measuring asset component performance using the set of information and a key performance indictor (KPI) engine, comparing end results of the measured asset component performance to respective quality specification data using a data mining engine configured to search and select specification data and historical performance data for the component asset, determining a probability that a process parameter affected the measured asset component performance, and presenting a visualization of a correlated analysis to one or more subscribed users.

In another aspect, a cross-domain enterprise collaborative decision support system includes one or more processors communicatively coupled to one or more memory devices, the one or more memory devices including computer-executable instructions that when executed by the one or more processors cause the one or more processors to perform programmed steps. The system also includes at least one self-configured and enriched traveling intelligence cell (TIC), a global business process management governor, the governor configured to for global manufacturing enterprises, and an asset component manager providing a set of information for analytics, the set of information including at least one of production equipment documentation and production systems documentation, production process events and thresholds, production process data, parameters, variables, and measures, and product process artifacts and documentation for predetermined key applications or functional areas. The system further includes an enterprise bill of material (BOM) including an Intelligent Enterprise Bill-of-Process (ieBOP), the ieBop including a generation manager configured to maintain a generative container of the TIC.

In yet another aspect, at least one non-transitory computer-readable storage media having computer-executable instructions embodied thereon is provided. When executed by at least one processor, the computer-executable instructions cause the processor to receive a set of information from an asset component through an embedded cell for analytics (ECA), the set of information including production equipment and production systems blueprint data, the asset component embodied in at least one of a machine and a process. The computer-executable instructions further cause the processor to analyze the set of information in real-time using a generative algorithm in a traveling intelligent cell (TIC), an intelligent enterprise bill-of-process including a generative container for the TIC, the TIC including at least one of a generic equipment and process data set, a specific equipment and process data set, and a dynamic deployment data set. The computer-executable instructions also cause the processor to measure asset component performance using the set of information and a key performance indictor (KPI) engine, compare end results of the measured asset component performance to respective quality specification data using a data mining engine configured to search and select specification data and historical performance data for the component asset, determine a probability that a process parameter affected the measured asset component performance, and present a visualization of a correlated analysis to one or more subscribed users.

BRIEF DESCRIPTION OF THE DRAWINGS

FIG. 1 is a schematic block diagram of an enterprise having a business goal in accordance with an example embodiment of the present disclosure.

FIG. 2 illustrates a block diagram of an implementation of a cross domain traveling intelligent cell (TIC) in an enterprise resource planning environment.

FIG. 3 is a schematic block diagram of a cross-domain enterprise collaborative decision support system in accordance with an example embodiment of the present disclosure.

FIG. 4 is a flow chart of a method of cross-domain enterprise collaborative decision support within an enterprise in accordance with an example embodiment of the present disclosure.

FIG. 5 is a block diagram of an exemplary enterprise process engine used to facilitate collaborative decision support in the enterprise shown in FIG. 1.

FIG. 6 shows an exemplary configuration of a database within a computing device, along with other related computing components, that may be used for cross-domain enterprise collaborative decision support within an enterprise.

DETAILED DESCRIPTION

Figure 1:
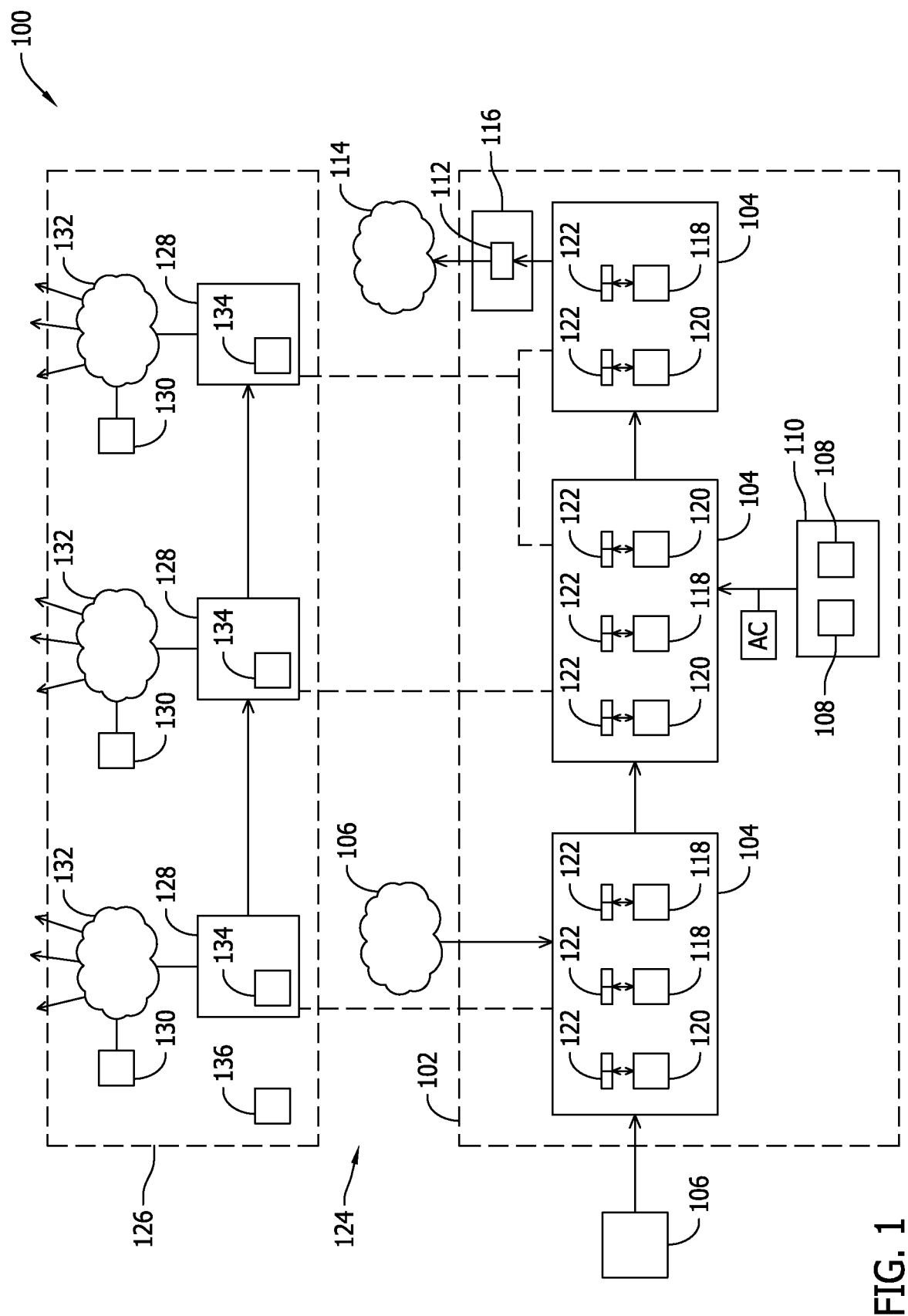
FIGS. 1-6 show exemplary embodiments of the methods and systems described herein.

The following detailed description illustrates embodiments of the disclosure by way of example and not by way of limitation. It is contemplated that the disclosure has general application to managing communication in an enterprise.

Enterprise resource planning (ERP) is typically implemented in business process management software that allows an organization to use a system of integrated applications to manage the business and automate many back office functions related to technology, services and human resources. ERP software integrates all facets of an operation, including product planning, development, manufacturing, sales and marketing.

ERP software is considered an enterprise application as it is designed to be used by larger businesses and often requires dedicated teams to customize and analyze the data and to handle upgrades and deployment. In contrast, Small business ERP applications are lightweight business management software solutions, customized for the business industry you work in.

In industry, product lifecycle management (PLM) is the process of managing the entire lifecycle of a product from inception, through engineering design and manufacture, to service and disposal of manufactured products.

Manufacturing operations management (MOM) is a methodology for viewing an end-to-end manufacturing process with a view to optimizing efficiency.

Manufacturing Execution Systems (MES) are computerized systems used in manufacturing. MES can provide the right information at the right time and show the manufacturing decision-maker how the current conditions on the plant floor can be optimized to improve production output. MES work in real time to enable the control of multiple elements of the production process (e.g. inputs, personnel, machines and support services).

MES might operate across multiple function areas, for example: management of product definitions across the product life-cycle, resource scheduling, order execution and dispatch, production analysis for Overall Equipment Effectiveness (OEE), and materials track and trace.

The idea of MES might be seen as an intermediate step between, on the one hand, an Enterprise Resource Planning (ERP) system, and a Supervisory Control and Data Acquisition (SCADA) or process control system on the other; although historically, exact boundaries have fluctuated.

As used herein, an element or step recited in the singular and proceeded with the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment of the present disclosure, a computer program is provided, and the program is embodied on a computer readable medium. In an exemplary embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

Embodiments of the present disclosure describe a cross-domain enterprise collaborative decision support system in an enterprise, such as a business enterprise. In the example embodiment, key attributes of the collaborative decision support system include at least one self-configured and enriched traveling intelligence cell (TIC), and a global business process management governor. The global business process management governor is configured to apply rules to processes, for example, within entities occurring within the global manufacturing enterprise. An asset component manager provides sets of information for analytics, the set of information including at least one of production equipment documentation and production systems documentation, production process events and thresholds, production process data, parameters, variables, and measures, and product process artifacts and documentation for predetermined key applications or functional areas. The collaborative decision support system further includes an enterprise bill of material (BOM) comprising an Intelligent Enterprise Bill-of-Process (ieBOP), the ieBop includes a generation manager configured to maintain a generative container for the TIC.

FIG. 1 is a schematic block diagram of an enterprise 100 having a business goal in accordance with an example embodiment of the present disclosure. In the example embodiment, enterprise 100 includes an enterprise organization 102 that includes a plurality of entities 104. Entities 104 may include various facilities, such as, but not limited to shipping and receiving facilities, office facilities, manufacturing facilities, including discrete manufacturing facilities, departments, such as, but not limited to human resources, engineering, accounting and other entities that facilitate the design, operation, maintenance, and management of enterprise 100. Enterprise 100 also includes an input of raw materials 106, parts and/or components 108 received from a contractor or supplier 110, and product 112, which is output to customers 114 through a shipping entity 116.

In some cases, at least some of entities 104 may include machines 118 and/or processes 120 that are monitored by a data acquisition system and/or a control system such as, a distributed control system (DAS/DCS) 122. Each of DAS/DCS 122 typically include a computing device having a processor and a memory. DAS/DCS 122 are networked together and to a supervisory control and data acquisition (SCADA) system 124, of which an intelligent electronic bill of process (IEBOP) system 126 may be a part. IEBOP system 126 is a computer-implemented system that facilitates organizing management information within an enterprise. Overall control of the management information system of enterprise 100 may be by an enterprise resource planner (ERP) (not shown) and IEBOP may form a part of the ERP or be communicatively coupled to it. In the example embodiment, IEBOP system 126 includes a plurality of enterprise process event monitors 128 and at least one respective threshold for each enterprise process event monitor 128 in an associated information engine 130. Enterprise process event monitors 128 are communicatively coupled to one or more IEBOP communication networks 132, which permit specified enterprise process event monitors 128 to communicate with each other and enterprise 100. Enterprise process event monitors 128 are configured to receive enterprise process data relating to the plurality of enterprise process event monitors 128 from information engine 130. The enterprise process data includes historical data relating to the enterprise process events being monitored, real-time current information relating to the enterprise process events, and predicted data based on the historical data, the current data and measured or derived parameters associated with the at least some of the plurality of enterprise process events, and algorithmic models of at least one of the enterprise process events including parameters, variables, and measurements. Real-time production process data includes one or more of maintenance process data, quality process data, warehouse process data, logistic process data, labor process data, safety process data, and security process data from a plurality of entities within enterprise 100, wherein the plurality of entities includes third party contractors to enterprise 100. In various embodiments, the enterprise process events include at least one production process event, a maintenance process event, a quality process event, a warehouse process event, a logistic process event, a labor process event, a safety process event, and a security process event. The enterprise process data is analyzed and compared to the stored thresholds to generate immediate actions directing subscribed parties to perform determined remedial procedures of an action plan. Subscription information is received from enterprise parties for each enterprise process event that the enterprise parties are to be informed of. Information relating to enterprise process events for which the enterprise parties are subscribed and which have exceeded a respective threshold value is periodically transmitted to the affected enterprise parties. The immediate actions are preplanned responses to off-normal or errant behavior of one or more of machines 118 and processes 120. The immediate actions direct subscribed parties to perform determined remedial procedures of an action plan and to report a status of implementation of previously transmitted immediate actions. The immediate actions are performed by a manager's organization and the manager updates the associated enterprise process event monitor 128, which causes reporting of the updates to IEBOP system 126 and subsequent notification of subscribed users.

At least one analytics cell 134 associated with each of the plurality of enterprise process events is generated for each machine or process included within a respective enterprise process event monitor 128. Analytics cell 134 is configured to monitor an operation of an associated machine 118 or process 120, analyze the operation of machine 118 or process 120 based on analytic rules received from at least one of information engine 130 and an IEBOP supervisory engine 136 communicatively coupled to analytics cell 134.

Figure 2:
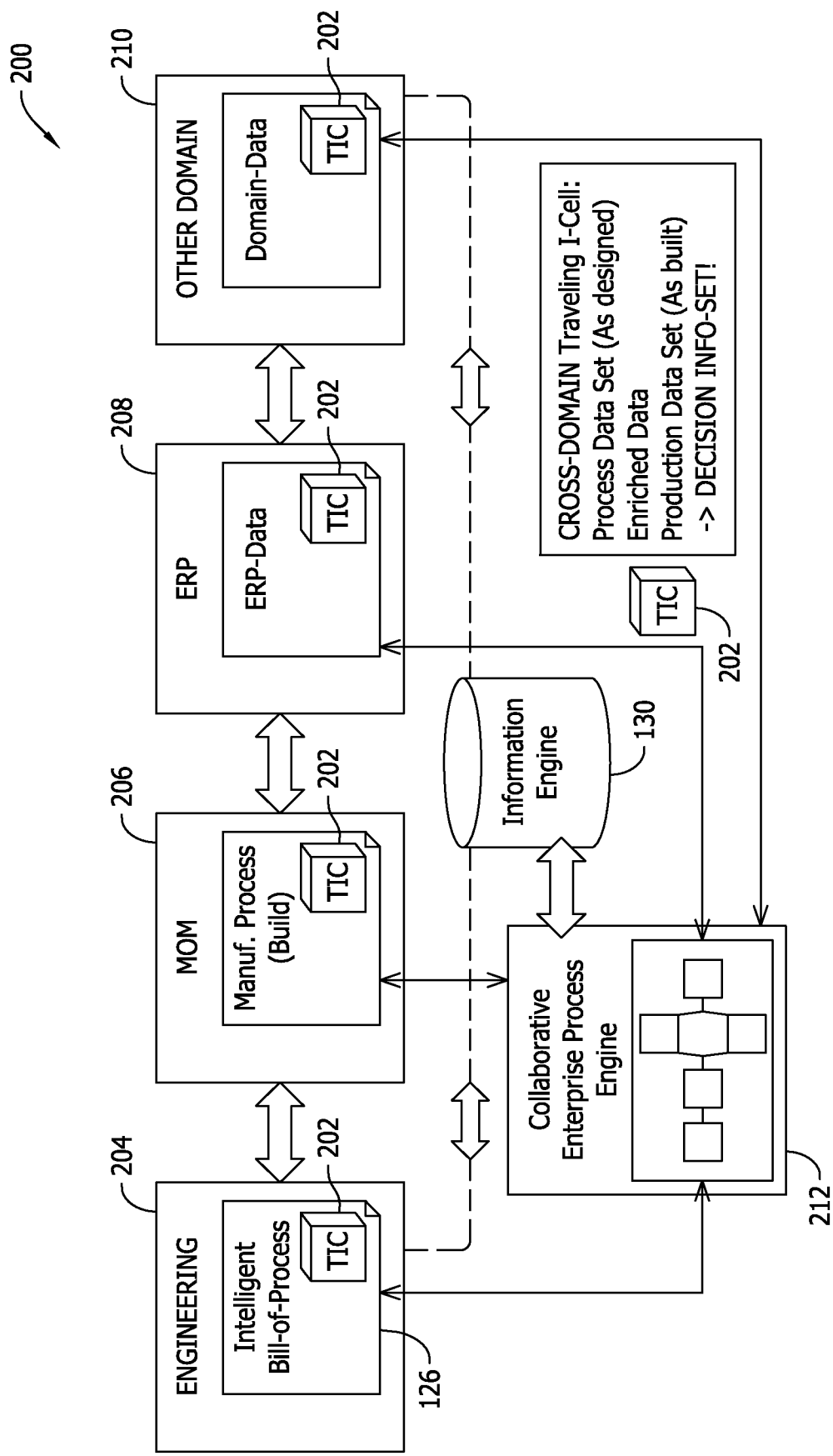

FIG. 2 illustrates a block diagram of an implementation of a cross domain traveling intelligent cell (TIC) 202 in an enterprise resource planning environment 200. In the example embodiment, environment 200 includes an engineering domain 204, a manufacturing operations management (MOM) domain 206, an enterprise resources domain 208, and may be extended to include other existing domains 210 and/or other future domains (not shown). TIC 202 is self-configured and automatically enriched traveling intelligent cell instantiated in each enterprise domain. Information engine 130 supports a collaborative enterprise process engine 212 that ensures the relevant business making workflows are implemented and managed in a global collaborative environment and across all domains.

Figure 3:
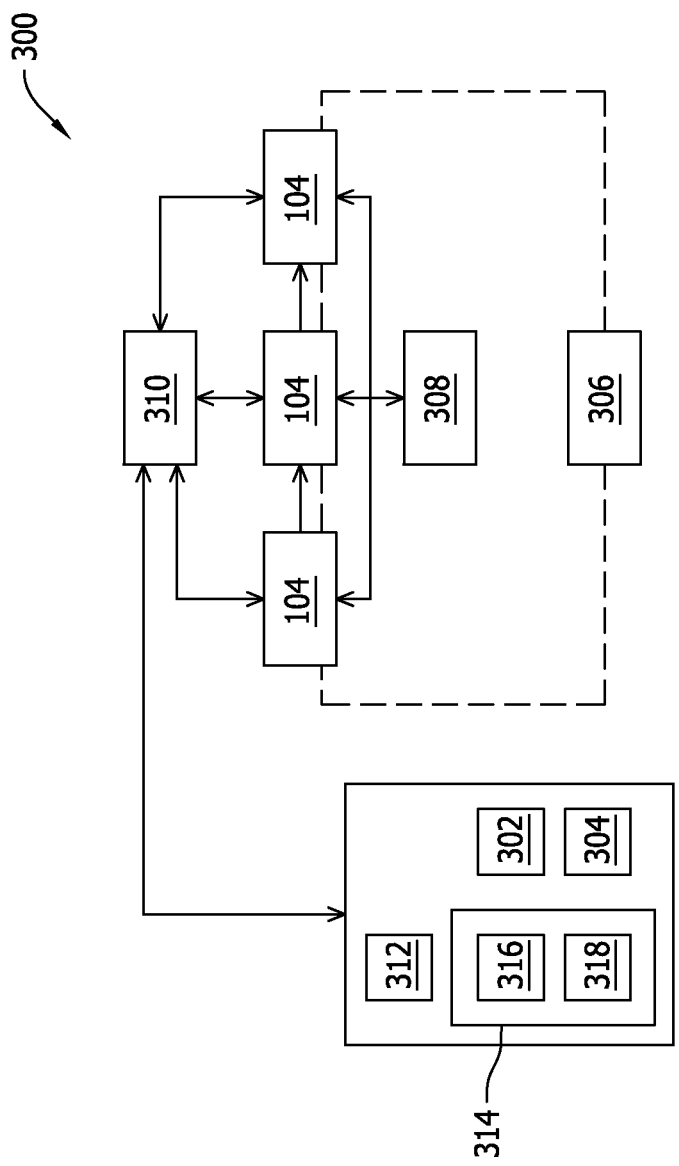

FIG. 3 is a schematic block diagram of a cross-domain enterprise collaborative decision support system 300 in accordance with an example embodiment of the present disclosure. In the example embodiment, system 300 includes one or more processors 302 communicatively coupled to one or more memory devices 304, at least one self-configured and enriched traveling intelligence cell (TIC) 306, and a global business process management governor 308. Governor 308 is configured to apply rules to processes, for example, within entities 104 occurring within global manufacturing enterprises 100. An asset component manager 310 provides sets of information 312 for analytics, the set of information including at least one of production equipment documentation and production systems documentation, production process events and thresholds, production process data, parameters, variables, and measures, and product process artifacts and documentation for predetermined key applications or functional areas. System 300 further includes an enterprise bill of material (BOM) 314 comprising an Intelligent Enterprise Bill-of-Process (ieBOP) 316, the ieBop 316 including a generation manager 318 configured to maintain a generative container of TIC 306.

Figure 4:
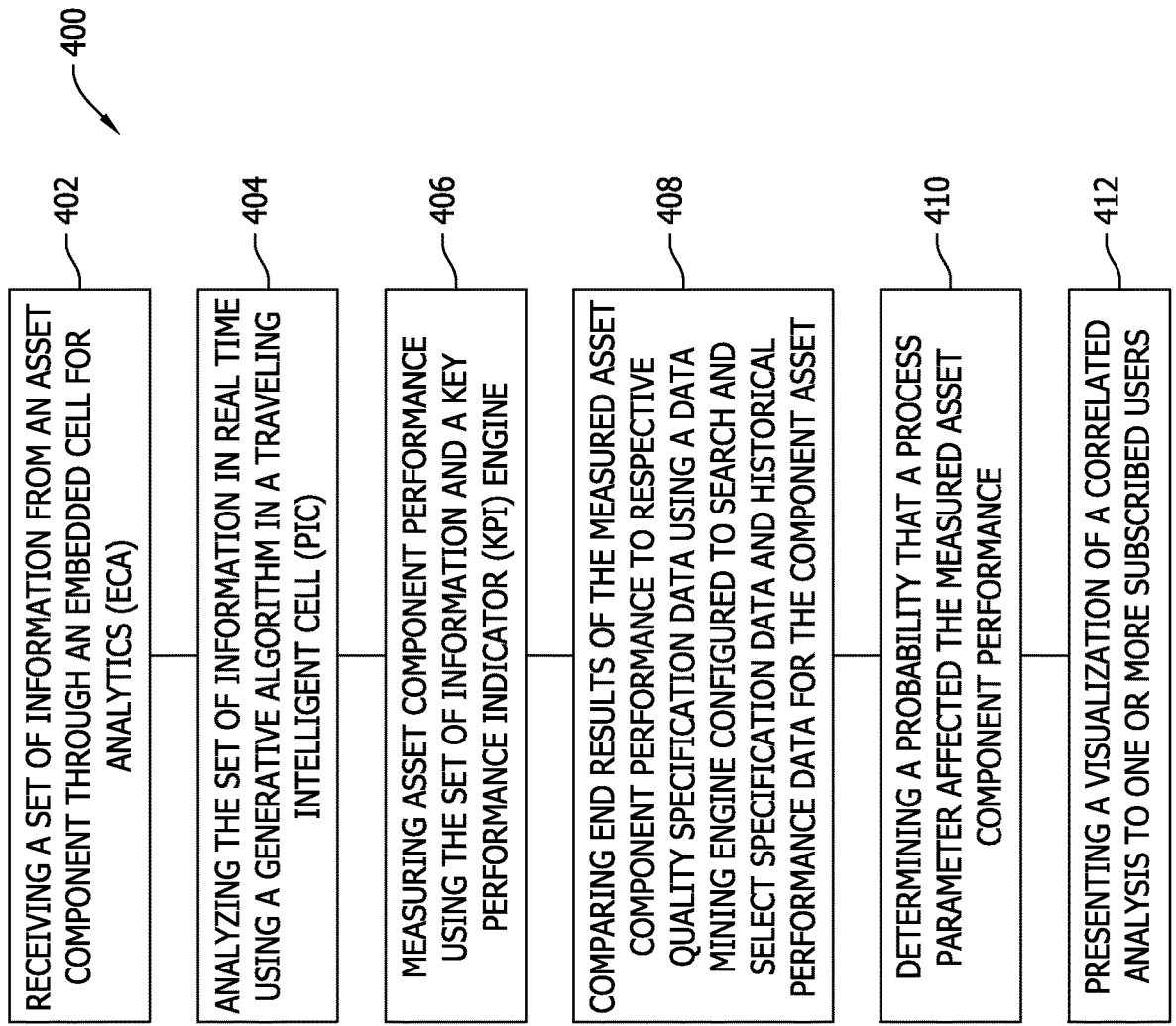

FIG. 4 is a flow chart of a method 400 of cross-domain enterprise collaborative decision support within an enterprise in accordance with an example embodiment of the present disclosure. In the example embodiment, method 400 includes receiving 402 a set of information from an asset component through an embedded cell for analytics (ECA), the set of information including production equipment and production systems blueprint data, the asset component embodied in at least one of a machine and a process. Method 400 also includes analyzing 404 the set of information in real-time using a generative algorithm in a traveling intelligent cell (TIC), an intelligent enterprise bill-of-process including a generative container for the TIC, the TIC including at least one of a generic equipment and process data set, a specific equipment and process data set, and a dynamic deployment data set. Method 400 also includes measuring 406 asset component performance using the set of information and a key performance indictor (KPI) engine and comparing 408 end results of the measured asset component performance to respective quality specification data using a data mining engine configured to search and select specification data and historical performance data for the component asset. Method 400 further includes determining 410 a probability that a process parameter affected the measured asset component performance and presenting 412 a visualization of a correlated analysis to one or more subscribed users.

Figure 5:
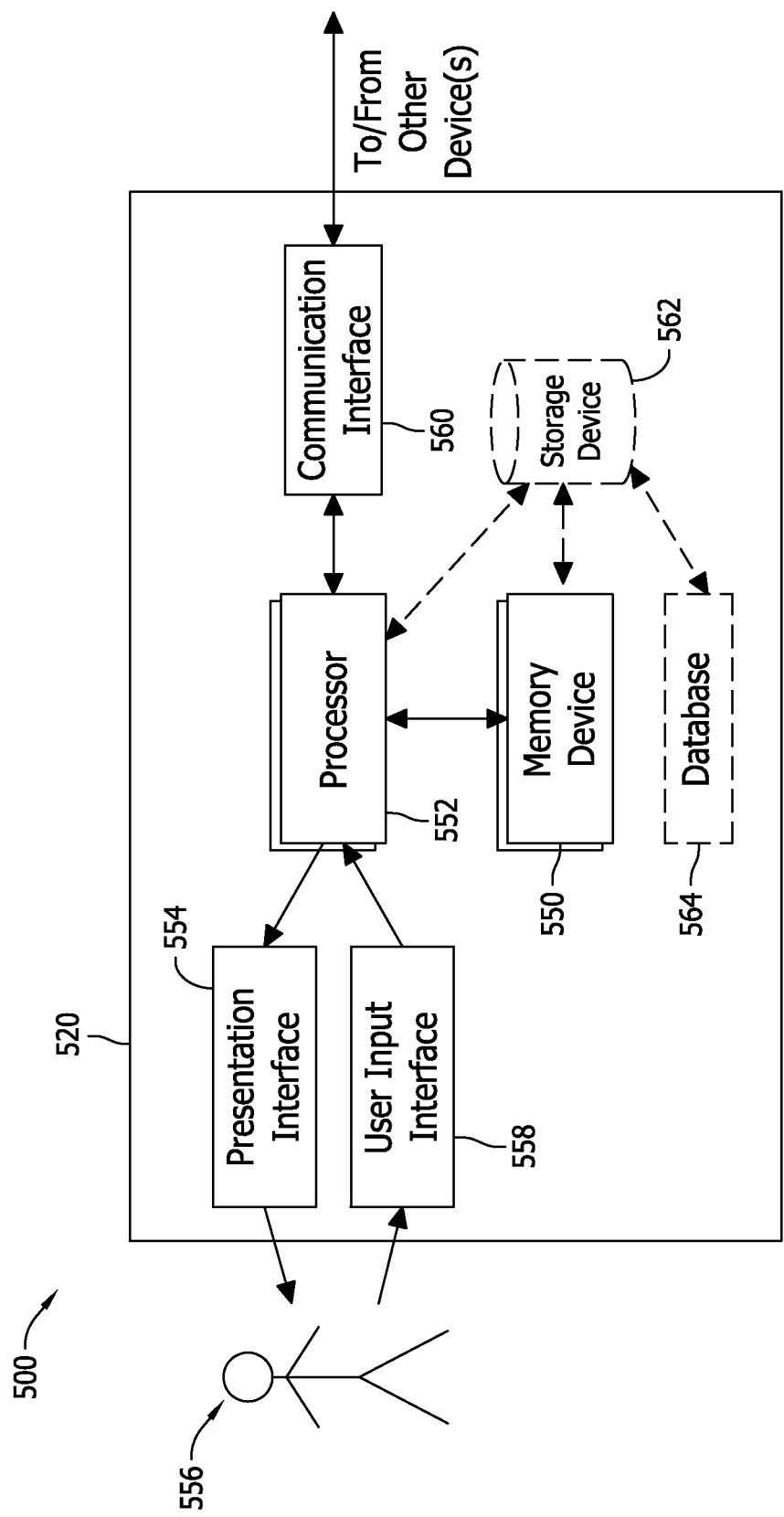

FIG. 5 is a block diagram 500 of a cross-domain enterprise collaborative decision support system 520 used to facilitate collaborative decision support in enterprise 100 (shown in FIG. 1). In the exemplary embodiment, system 520 facilitates collaborative decision support across various domains of a business enterprise and provides results to enterprise 100 through for example, data structures within a memory device 550. Collaborative decision support system 520 mines data to facilitate analysis and determination of eminent failure and trends in enterprise equipment and processes.

In the exemplary embodiment, collaborative decision support system 520 includes a memory device 550 and a processor 552 operatively coupled to memory device 550 for executing instructions. In some embodiments, executable instructions are stored in memory device 550. Collaborative decision support system 520 is configurable to perform one or more operations described herein by programming processor 552. For example, processor 552 may be programmed by encoding an operation as one or more executable instructions and providing the executable instructions in memory device 550. Processor 552 may include one or more processing units, e.g., without limitation, in a multi-core configuration.

In the exemplary embodiment, memory device 550 is one or more devices that enable storage and retrieval of information such as executable instructions and/or other data. Memory device 550 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

In the exemplary embodiment, memory device 550 may be configured to store a variety of component and module data associated with various components and sub-components in data structures, files, or other memory areas. Further, memory device 550 may also store component relationship data and threshold data, or other machine or process-related data such as shown in FIGS. 1-4.

In some embodiments, collaborative decision support system 520 includes a presentation interface 554 coupled to processor 552. Presentation interface 554 presents information, such as a user interface and/or an alarm, to a user 556. For example, presentation interface 554 may include a display adapter (not shown) that may be coupled to a display device (not shown), such as a cathode ray tube (CRT), a liquid crystal display (LCD), an organic LED (OLED) display, and/or a hand-held device with a display. In some embodiments, presentation interface 554 includes one or more display devices. In addition, or alternatively, presentation interface 554 may include an audio output device (not shown), e.g., an audio adapter and/or a speaker.

In some embodiments, collaborative decision support system 520 includes a user input interface 558. In the exemplary embodiment, user input interface 558 is coupled to processor 552 and receives input from user 556. User input interface 558 may include, for example, a keyboard, a pointing device, a mouse, a stylus, and/or a touch sensitive panel, e.g., a touch pad or a touch screen. A single component, such as a touch screen, may function as both a display device of presentation interface 554 and user input interface 558.

In the exemplary embodiment, a communication interface 560 is coupled to processor 552 and is configured to be coupled in communication with one or more other devices such as, another computing system, or any device capable of accessing collaborative decision support system 520 including, without limitation, a portable laptop computer, a personal digital assistant (PDA), and a smart phone. Communication interface 560 may include, without limitation, a wired network adapter, a wireless network adapter, a mobile telecommunications adapter, a serial communication adapter, and/or a parallel communication adapter. Communication interface 560 may receive data from and/or transmit data to one or more remote devices. Collaborative decision support system 520 may be web-enabled for remote communications, for example, with a remote desktop computer (not shown).

In the exemplary embodiment, presentation interface 554 and/or communication interface 560 are capable of providing information suitable for use with the methods described herein, e.g., to user 556 or another device. Accordingly, presentation interface 554 and/or communication interface 560 may be referred to as output devices. Similarly, user input interface 558 and/or communication interface 560 are capable of receiving information suitable for use with the methods described herein and may be referred to as input devices.

Further, processor 552 and/or memory device 550 may also be operatively coupled to a storage device 562. Storage device 562 is any computer-operated hardware suitable for storing and/or retrieving data, such as, but not limited to, data associated with a database 564. In the exemplary embodiment, storage device 562 is integrated in collaborative decision support system 520. For example, collaborative decision support system 520 may include one or more hard disk drives as storage device 562. Moreover, for example, storage device 562 may include multiple storage units such as hard disks and/or solid state disks in a redundant array of inexpensive disks (RAID) configuration. Storage device 562 may include a storage area network (SAN), a network attached storage (NAS) system, and/or cloud-based storage. Alternatively, storage device 562 is external to collaborative decision support system 520 and may be accessed by a storage interface (not shown).

Moreover, in the exemplary embodiment, database 564 contains a variety of static and dynamic operational data associated with components, modules, machines and processes.

The embodiments illustrated and described herein as well as embodiments not specifically described herein but within the scope of aspects of the disclosure, constitute exemplary means for managing enterprise process data, communication and organization. For example, collaborative decision support system 520, and any other similar computer device added thereto or included within, when integrated together, include sufficient computer-readable storage media that is/are programmed with sufficient computer-executable instructions to execute processes and techniques with a processor as described herein. Specifically, collaborative decision support system 520 and any other similar computer device added thereto or included within, when integrated together, constitute an exemplary means for managing enterprise process data, communication and organization.

Figure 6:
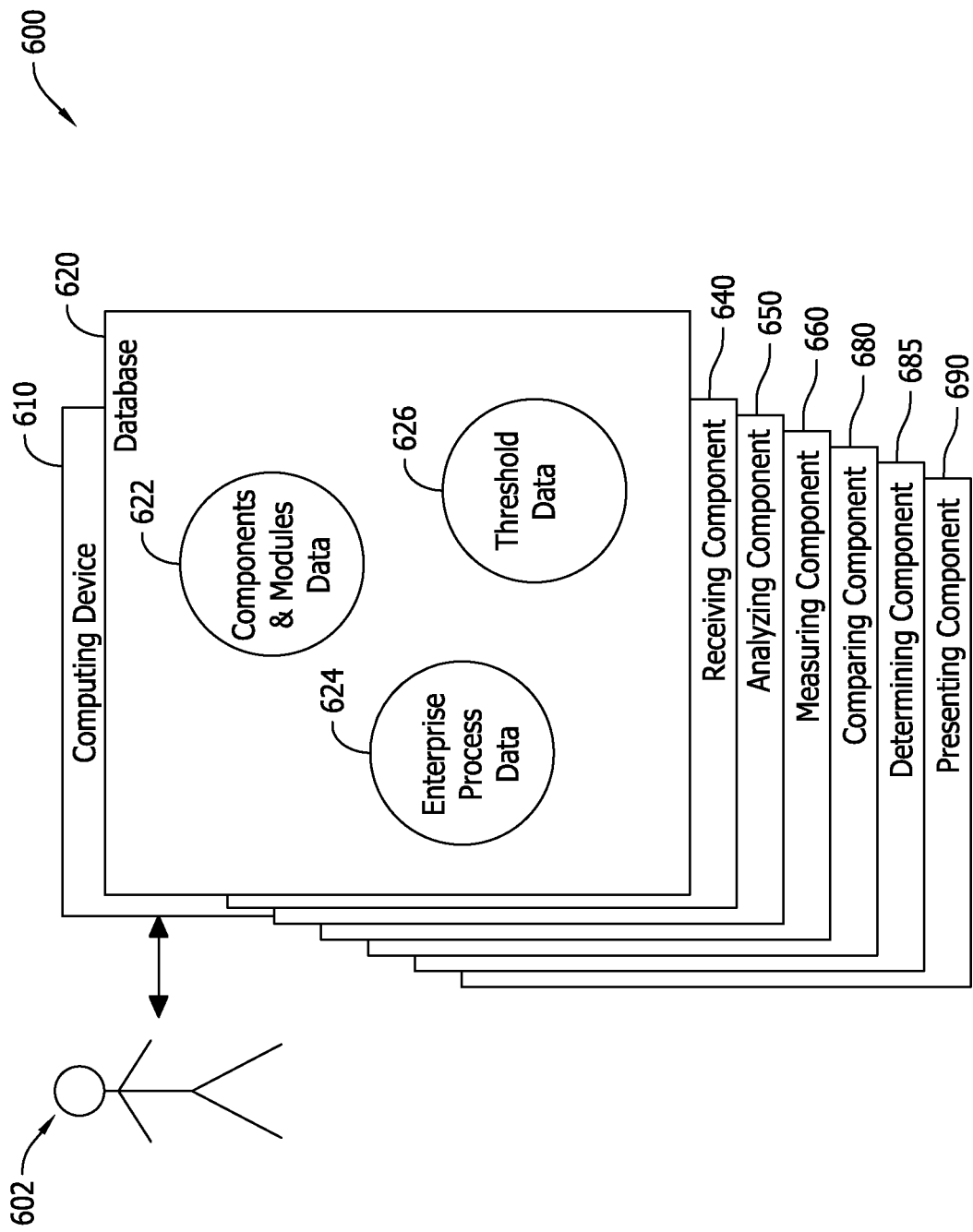

FIG. 6 shows an exemplary configuration 600 of a database 620 within a computing device 610, along with other related computing components, that may be used for cross-domain enterprise collaborative decision support. In some embodiments, computing device 610 is similar to collaborative decision support system 520 (shown in FIG. 5). Database 620 is coupled to several separate components within computing device 610, which perform specific tasks.

In the exemplary embodiment, database 620 includes components and modules data 622, enterprise process data 624, and threshold data 626. In some embodiments, database 620 is similar to database 564 (shown in FIG. 5). Components and modules data 622 includes information associated with design components and modules as described above in reference to FIGS. 1-4. Enterprise process data 624 includes historical data relating to the enterprise process events, real-time current information relating to the enterprise process events, predicted data based on the historical data, the current data and measured or derived parameters associated with the at least some of the plurality of enterprise process events, and algorithmic models of at least one of the enterprise process events including parameters, variables, and measurements. Threshold data 626 includes data associated with limits and computational bounds of any of the enterprise process data.

Computing device 610 includes the database 620, as well as data storage devices 630. Computing device 610 includes a receiving component 640 for receiving a set of information from an asset component through an embedded cell for analytics (ECA). Computing device 610 also includes an analyzing component 650 for analyzing the set of information in real-time using a generative algorithm in a traveling intelligent cell (TIC). Computing device 610 also includes a measuring component 660 for measuring asset component performance using the set of information and a key performance indictor (KPI) engine. Computing device 610 also includes a comparing component 680 for comparing end results of the measured asset component performance to respective quality specification data using a data mining engine configured to search and select specification data and historical performance data for the component asset. Computing device 610 also includes a determining component 685 for determining a probability that a process parameter affected the measured asset component performance. Computing device 610 further includes a presenting component 690 for presenting a visualization of a correlated analysis to one or more subscribed users.

As will be appreciated based on the foregoing specification, the above-described embodiments of the disclosure may be implemented using computer programming or engineering techniques including computer software, firmware, hardware or any combination or subset thereof, wherein the technical effect is a system for managing enterprise process data, communication and organization. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

At least one of the technical problems addressed by this system includes: (i) excellent collaborative enterprise business decision management and (ii) holistic lean approach for enterprise management. Other technical problems addressed by the system and methods described herein may include increased computer processing due to unnecessary components appearing in the system, thus slowing down the computer.

The methods and systems described herein may be implemented using computer programming or engineering techniques including computer software, firmware, hardware, or any combination or subset thereof, wherein the technical effects may be achieved by performing at least one of the following steps: (a) receiving a set of information from an asset component through an embedded cell for analytics (ECA), (b) analyzing the set of information in real-time using a generative algorithm in a traveling intelligent cell (TIC), the TIC including at least one of a generic equipment and process data set, a specific equipment and process data set, and a dynamic deployment data set, (c) measuring asset component performance using the set of information and a key performance indictor (KPI) engine, (d) comparing end results of the measured asset component performance to respective quality specification data using a data mining engine configured to search and select specification data and historical performance data for the component asset, (d) determining a probability that a process parameter affected the measured asset component performance and (e) presenting a visualization of a correlated analysis to one or more subscribed users.

The resulting technical effect achieved by this system is at least one of reducing computational requirements for maintaining organized management information within an enterprise by, for example, using active retrieval of data, analyzing the data based on successive states of the enterprise, subscribing users interested in the data and analysis, and providing the data and analysis to the subscribed users, and thus a reduced burden on the computer.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method of cross-domain enterprise collaborative decision support within an enterprise formed of a plurality of enterprise process domains, said method using a computing device having at least one processor and at least one memory device, said method comprising:
   generating a traveling intelligent cell (TIC) for each asset component included within a respective enterprise process event monitor within the enterprise, the TIC instantiated in each enterprise process domain, the TIC configured to monitor an operation of an associated asset component in the plurality of enterprise process domains;
   receiving, by the TIC, a set of information from an asset component of a first enterprise process domain of the plurality of enterprise process domains through an embedded cell for analytics (ECA), the set of information including production equipment documentation and production systems documentation;
   analyzing, by the TIC, the set of information in real-time using a generative algorithm including at least one of a generic equipment and process data set, a specific equipment and process data set, and a dynamic deployment data set specific to the associated asset component;

measuring, by the TIC, asset component performance using the set of information and a key performance indictor (KPI) engine;

determining a trend of current operation of equipment of the enterprise by a data mining engine using the measured asset component performance;

analyzing the determined trend of the current operation of equipment and historical trends of an operation of the equipment for imminent failures of equipment or processes based on an occurrence of a failure precursor;

outputting a probability of the occurrence of the imminent failure based on the analysis;

determining a schema of the failed equipment or process that preceded the failure;

searching quality specification data and historical performance data of the component asset using the data mining engine;

selecting the quality specification data and historical performance data for the component asset;

comparing end results of the measured asset component performance to respective quality specification data;

determining a probability that a specific component, production process, or machine affected the measured asset component performance based at least in part on the probability of the occurrence of the imminent failure, the determined schema, and the comparison;

presenting a dashboard including a visualization of a correlated analysis based on a set of preferences of respective subscribed users of the one or more subscribed users, the correlated analysis facilitates a collaborative decision by subscribed users across various domains of the business enterprise, outputting immediate actions based on the collaborative decision, the immediate actions being preplanned responses to off-normal or errant behavior of the machine or the process, the immediate actions direct subscribed users to perform determined remedial procedures of an action plan and to report a status of implementation of the immediate actions, and receiving the status of implementation of the immediate actions and generating a determination of imminent failure and trends in the enterprise equipment and processes.

2. The computer-implemented method of claim 1, wherein receiving a set of information comprises receiving a set of information that includes production process events and thresholds, production process data including at least one of parameters, variables, and measures, and product process artifacts and documentations for predetermined key applications or functional areas.

3. The computer-implemented method of claim 2, wherein the predetermined key applications or functional areas include at least one of a production key application or functional area, a maintenance key application or functional area, a quality key application or functional area, a warehouse key application or functional area, a logistic key application or functional area, a time and labor key application or functional area, a safety and security key application or functional area.

4. The computer-implemented method of claim 1, wherein presenting a visualization of a correlated analysis to one or more subscribed users comprises presenting a dashboard to the subscribed users, the dashboard including a visualization based on a set of preferences of a respective user.

5. A cross-domain enterprise collaborative management decision support system comprising:

a plurality of machines and processes monitored by at least one of a data acquisition system and a control system;

one or more processors communicatively coupled to one or more memory devices, said one or more memory devices including computer-executable instructions that when executed by the one or more processors cause the one or more processors to perform programmed steps;

at least one self-configured and enriched traveling intelligence cell (TIC) instantiated in each enterprise process domain, the TIC including at least one of a generic equipment and process data set, a specific equipment and process data set, and a dynamic deployment data set;

a global business process management governor, said governor configured to apply rules to processes for global manufacturing enterprises;

an asset component manager providing a set of information for analytics, the set of information including at least one of production equipment documentation and production systems documentation, production process events and thresholds, production process data, parameters, variables, and measures, and product process artifacts and documentation for predetermined key applications or functional areas; and an enterprise bill of material (BOM) comprising an Intelligent Enterprise Bill-of-Process (ieBOP), the ieBop including:

a generation manager configured to maintain a generative container of the TIC; and an enterprise process events monitor configured to:

receive enterprise process data relating to a plurality of enterprise process events from the asset component manager for which enterprise parties are subscribed and which have exceeded a respective threshold value, the enterprise process data including historical data relating to the enterprise process events being monitored, real-time current information relating to the enterprise process events, and predicted data based on the historical data, current data and measured or derived parameters associated with the at least some of the plurality of enterprise process events, and algorithmic models of at least one of the enterprise process events including parameters, variables, and measurements;

generate immediate actions directing subscribed users to perform predetermined remedial procedures of an action plan based on the exceeded threshold value, the immediate actions being preplanned responses to off-normal or errant behavior of one or more of the plurality of machines and processes;

receive a status of implementation of the immediate actions and generate a determination of imminent failure and trends in the plurality of machines and processes; and periodically transmit the received real-time current information to the subscribed users; and a data mining and prediction engine configured to:

predict failures of the plurality of machines and processes based on a prediction of an occurrence of a failure precursor;

output a probability of the predicted occurrence; and determine a schema of the failed the plurality of machines and processes that preceded the failure and a probability of a cause by a specific component, production process, or machine.

6. The system of claim 5, wherein the predetermined key applications or functional areas include at least one of production, maintenance, quality, warehouse, logistic, time and labor, and safety and security.

7. The system of claim 5, wherein the at least one of production equipment documentation and production systems documentation includes drawings, images, work instructions, procedures, and check lists.

8. The system of claim 5, wherein the set of information is received from an Embedded Cell for Analytics (ECA).

9. The system of claim 5, wherein elements of a discrete manufacturing portfolio of the enterprise includes at least one ECA.

10. The system of claim 5, wherein said TIC includes at least one of a generic equipment and process data set, a specific equipment and process data set, and a dynamic deployment data set, the dynamic deployment data set specific to at least one of a facility, a resource, and a user.

11. The system of claim 5, further comprising an information engine configured to facilitate analytics and management decision-making, the information engine configured to analyze data in real time, based on pre-defined events.

12. The system of claim 5, wherein the data mining engine is configured to determine a trend of current operation of the enterprise and analyze historical trend comparison for imminent failures of equipment or processes.

13. One or more non-transitory computer-readable storage media having computer-executable instructions embodied thereon, wherein when executed by at least one processor, the computer-executable instructions cause the processor to:

receive a set of information from an asset component through an embedded cell for analytics (ECA), the set of information including production equipment and production systems blueprint data;

analyze the set of information in real-time using a generative algorithm in a traveling intelligent cell (TIC), an intelligent enterprise bill-of-process including a generative container for the TIC, the TIC including at least one of a generic equipment and process data set, a specific equipment and process data set, and a dynamic deployment data set;

measure asset component performance using the set of information and a key performance indictor (KPI) engine;

determine a trend of current operation of equipment of the enterprise by a data mining engine using the measured asset component performance;

analyze the determined trend of the current operation of equipment and historical trends of an operation of the equipment for imminent failures of equipment based on an occurrence of a failure precursor;

output a probability of the occurrence of the imminent failure;

compare end results of the measured asset component performance to respective quality specification data using a data mining engine configured to search and select specification data and historical performance data for the component asset;

predict using a data mining and prediction engine, failures of equipment or processes based on a prediction of an occurrence of a failure precursor;

determine a probability that a specific component, production process, or machine affected the measured asset component performance; and present a dashboard including a visualization of a correlated analysis based on a set of preferences of respective subscribed users of the one or more subscribed users, the correlated analysis facilitates a collaborative decision by subscribed users across various domains of the business enterprise.

14. The computer-readable storage media of claim 13, wherein the computer-executable instructions further cause the processor to receive a set of information that includes production process events and thresholds, production process data including at least one of parameters, variables, and measures, and product process artifacts and documentations for predetermined key applications or functional areas.

15. The computer-readable storage media of claim 14, wherein the computer-executable instructions further cause the processor to receive predetermined key applications or functional areas include at least one of a production key application or functional area, a maintenance key application or functional area, a quality key application or functional area, a warehouse key application or functional area, a logistic key application or functional area, a time and labor key application or functional area, a safety and security key application or functional area.

16. The system of claim 5, wherein the ieBOP is further configured to:

receive a status of implementation of the generated immediate actions from the subscribed enterprise parties; and report any updates to the subscribed enterprise parties.

* * * * *